Figure 1:
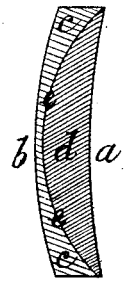

(No Model.)

E. GUNDLACH.
PHOTOGRAPHIC OBJECTIVE.

No. 442,251. Patented Dec. 9, 1890.

Witnesses.
F H Corbusier
C E Nagle

Inventor:
Ernst Gundlach.

UNITED STATES PATENT OFFICE.

ERNST GUNDLACH, OF ROCHESTER, NEW YORK.

PHOTOGRAPHIC OBJECTIVE.

SPECIFICATION forming part of Letters Patent No. 442,251, dated December 9, 1890.

Application filed February 28, 1890. Serial No. 342,169. (No model.)

*To all whom it may concern:*

Be it known that I, ERNST GUNDLACH, a subject of the Emperor of Germany, residing at Rochester, in the county of Monroe and State of New York, United States of America, have invented a certain new and useful Improvement in Photographic Objectives, of which the following is a specification.

My improvement relates especially to photographic objectives or combinations of lenses used for the purpose of taking portraits, views, and other subjects.

All the best photographic objectives of modern type consist of two achromatic or aplanatic meniscuses, this form of lenses being the best adapted for the purpose of obtaining a wide angular field with a minimum of distortion at or near the edges of the picture; but while for said purpose the meniscal form offers great advantages over any other kind of lenses, a disadvantage of the same, however, lies in the difficulty of correcting its optical aberrations, both the spherical and the chromatic, at the same time without leaving too great an amount of the so-called "aberrations of second order," and the object of my improvement to be described first is the reduction of said secondary errors to an imperceptible minimum.

The following is a full description of this invention:

Owing to the fact that the ratio of the color-dispersive power of flint-glass to its medium refractive power, (line D,) commonly termed "dispersive power" or "dispersion," is greater than that of crown-glass, an achromatic lens may be produced by the combination of a (positive) crown-glass lens with a negative flint-glass lens, the dispersive power of which is equal in amount to that of the crown-glass lens, for with equal amounts of dispersive power the (medium) refractive power of the crown-glass lens is greater than that of the flint-glass lens, and the preponderant part of that of the crown-glass lens forms the positive focal power or focal length of the combination, thus being the true constituent of the achromatic lens. ("Focal power" I term the "amplifying" or "reducing" power of a lens in relation to or expressed by its focal length, the focal power being inversely as the focal length.)

The ratio of the focal power of the crown-glass lens to that of the flint-glass lens in an achromatic combination is as the ratio of the dispersive power of the flint-glass to that of the crown-glass employed for the construction of the lenses, and is inversely as the ratio of the focal power of the crown-glass lens to that of the combination. From this follows that the greater the dispersive power of the flint-glass employed the lower a focal power of the crown-glass lens will be required for a given focal power of the combination or achromatic lens, and consequently the smaller will be the amount of color-dispersion to be corrected by the flint-glass lens. Furthermore, regarding the established fact that in an achromatic lens neither the spherical nor the chromatic aberrations can be completely neutralized, but that more or less small proportions of these errors (the aberrations of second order consisting in an incomplete or under correction of the central part or toward the center, and a corresponding over correction toward the edge of the lens) will always remain, it follows from the foregoing conclusions that the amount of chromatic aberration of second order in an achromatic combination will be the smaller the greater the dispersive power of the flint-glass employed. While thus the amount of chromatic aberration of a single or uncorrected lens depends with a given kind of glass on its focal power or focal length alone and is to be corrected accordingly, its spherical aberration, however, depends also and in a higher degree on the form of the lens—that is, on the difference of the curvatures of its surfaces—and is the greater in amount the more said curvatures differ from each other. An equal-sided lens is, under ordinary conditions, of minimum, a meniscus—that is, a concavo-convex lens—of maximum spherical aberration. The spherical aberration of a positive lens may therefore be corrected by a negative lens of almost any focal power if the curvatures of the same can be made to differ sufficiently to produce an amount of spherical aberration equal to that of the positive lens. If, therefore, the positive lens is of minimum spherical aberration—that is, equal-sided, or nearly so—a negative meniscus of much lower focal power than that of the positive lens may correct said aberration, and since the difference of the focal powers of the components forms the focal power of the combination, the latter will in this case be comparatively great, or, vice versa, the focal power of the positive component will be comparatively small, and consequently the amount of spherical aberration to be corrected by the negative lens will be small, leaving a correspondingly-small amount of aberration of second order. If, however, the positive lens of the combination is itself a meniscus, as is the case with the photographic objective, then the focal power of its negative or correcting lens cannot be made to be much lower than that of the positive lens, or else it would be impossible to produce, even with the greatest admissible difference of its curvatures, the amount of negative spherical aberration required for the correction of the positive lens, and consequently the remaining focal power, respectively that of the combination, will be small in comparison with that of its positive component. Hence the focal power of the crown-glass lens in an achromatic meniscus of a given focal power is to be comparatively great, and being besides this a meniscus itself, its spherical aberration must be accordingly great, thus leaving a correspondingly great amount of aberration of second order after being corrected by the flint-glass lens.

Having thus pointed out the distinguishing characteristics of the two optical aberrations and explained the proper mode of their correction, it remains to illustrate the principle after which both corrections are accomplished at the same time in the modern photographic objective.

Figure 2:
Figure 3:
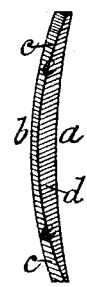
Figure 4:
Figure 5:
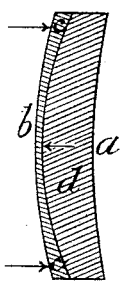
Figure 6:
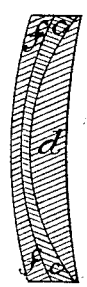
Figure 7:
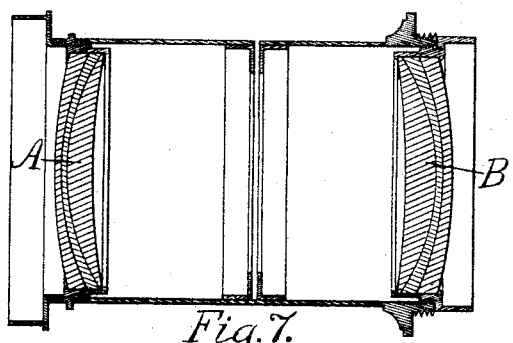

Figure 1 of the accompanying drawings is a sectional view of a meniscus of the ordinary photographic objective, the components being cemented together. Fig. 2 shows a meniscus the spherical aberration of which is corrected by a negative lens made of a glass of equal refractive power to that of the positive lens, the components not being cemented together. Fig. 3 shows a cemented meniscus in which the chromatic but not the spherical aberration is corrected by a negative lens made of a high-dispersive flint-glass. Fig. 4 represents an uncemented meniscus made of the same kinds of glasses as Fig. 3, but both the chromatic and the sperical aberrations being corrected. Fig. 5 is designed to demonstrate my novel way of so altering the form of the meniscus, Fig. 3, that both optical aberrations are corrected and at the same time the components of the meniscus can be cemented together; and Fig. 6 shows the alteration completed, thus representing in sectional view my new photographic meniscus or objective. Fig. 7 is a longitudinal section of a compound photographic objective consisting of two meniscuses of my new type.

The meniscus, Fig. 1, is composed of a positive crown-glass lens $d$ and a negative flint-glass lens $c$, the latter being of lower focal power than the crown-glass lens, thus leaving the preponderant part of the latter as the focal power or focal length of the combination. The facing sides $e$ of the lenses are of equal radii of curvatures and are cemented together, this arrangement being a necessity in photographic lenses. The fact that flint-glass has not only a very high color-dispersive power, but that also its medium refractive power is greater than that of crown-glass, permits the cementing, otherwise the flint-glass lens would have to be of a still shorter meniscal curvature, so as to form a space between the lenses, as shown in Fig. 2, in order to produce with its lower focal power an amount of spherical aberration equal to that of the crown-glass lens.

Suppose now the flint-glass lens $c$, Fig. 1, to be made of ordinary flint-glass, such as is commonly used in telescope objectives and similar achromatic lenses. Then the internal sides $e$, being, as may be assumed, of the proper though unusually short curvature as required in this case for the correction of the spherical aberration, will be much too short for the proper correction of the chromatic aberration, thus producing a corresponding over correction of the same. If then the curve $e$ be flattened, the dispersion of both lenses will be reduced of course; but that of the flint-glass lens will diminish in a higher ratio than that of the crown-glass lens, owing to the higher dispersive power of the former, and thus a point will soon be reached at which the dispersive powers of both lenses are equal in amount, as required for the correction of the chromatic aberration. Fig. 3 is to illustrate this case, showing the inner curve $e$ as being considerably flatter than in Fig. 1 and of the proper radius for the purpose, as may be assumed. This change, however, interferes with the correction of the spherical aberration, which is thereby reduced to a corresponding under correction, as is obvious.

It will now be readily understood that owing to the peculiarly conflicting relations and the distinguishing characteristics of the two aberrations, as shown, it is impossible to correct both aberrations of a crown-glass meniscus at the same time by the single means of a negative lens made of ordinary or any other high-dispersive flint-glass in the manner described and illustrated by Figs. 1 and 3. Considering, however, the causes of this impossibility, as shown, it suggests itself that with a flint-glass of a certain low-dispersive power, or with two glasses of a correspondingly-low difference of their dispersions, the desired result may be fully accomplished, and that such special properties of the glasses as required for the purpose may be accurately predetermined by calculation. This principle was discovered by the late mathematician, Steinheil, of Germany, many years ago, and has been ever since and up to the present time generally adopted by all the leading opticians in the world. In fact it has been and is yet the basis *par excellence* for the construction of photographic objectives.

In my foregoing description of the optical aberrations I have shown that the amount of the chromatic aberration of second order in the achromatic lens will be the smaller the higher the color-dispersive power of the flint-glass employed. The same is the case with the spherical aberration of second order, for since the focal power, and with it the chromatic aberration of the crown-glass lens, is reduced by the use of high-dispersive flint-glass, as I have shown, its spherical aberration must also be reduced in the same proportion. Let us now apply these rules inversely to the modern photographic objective described, and it appears that, notwithstanding its valuable and superior properties, a serious defect is nevertheless inherent in the same, consisting in an excessive amount of aberrations of second order as an inevitable result of the employment of a flint-glass of extremely-low dispersive power, and the reduction of this defect to an imperceptible minimum is the object of my first improvement, which I describe as follows:

I employ in my new photographic objective the ordinary telescope flint-glass, or even such of still higher dispersive power, and I form and arrange the whole in such a novel manner that both the spherical and the chromatic aberrations (of the first order) will be corrected at the same time. Thus I secure the great value lying in the employment of high-dispersive flint-glass and accomplish the desired purpose under full preservation of the advantages otherwise attained by the use of low-dispersive flint-glass, as in the old meniscus described.

Let us refer again to the meniscus, Fig. 3 of the accompanying drawings, in which a flint-glass of high-dispersive power is assumed to be employed, as described, and it will be remembered, as I have shown, that in this form of meniscus the correction of the chromatic aberration requires the internal sides $e$ of the components $d$ and $c$ to be of much flatter curvature than those in Fig. 1, where a low-dispersive flint-glass is employed, but that with such flat curvature the spherical aberration is only partly neutralized, respectively, under corrected. A simple way, however, of completing the correction of the latter without disturbing that of the chromatic aberration will be to shorten the meniscal curvature of the flint-glass lens $c$ under preservation of its focal power.

Fig. 4 represents the type of aplanatic meniscus thus formed, and, in fact, this form would be a great improvement over that now in general use were it not for the fact that the lenses cannot be cemented together, and thus the two surfaces $e$ and $g$ be allowed to cause reflections very injurious to the photographic image or picture. Let us therefore return to the meniscus, Fig. 3, and suppose the flint-glass lens $c$ to be flexible, the crown-glass lens $d$, however, to be in a fluid state. Let us further presume the whole to be inclosed in a vessel for the purpose of preserving the outer form of the meniscus. Let, then, the edge of the flint-glass lens $c$ be bent off the side $b$ of the vessel toward the side $a$, while the center of the lens is held in its place against the side $b$ of the vessel, as illustrated in Fig. 5, and indicated by the arrows. This operation will shorten the meniscal curvature of the lens and increase its negative spherical aberration without disturbing the chromatic correction of the combination. Let the operation be continued until the flint-glass lens has attained the form presented in Fig. 6, assuming that at this curvature the spherical aberration of the lens has reached the required amount. This is the point where both aberrations are corrected in the combination, and therefore the desired result is accomplished.

The form of the crown-glass lens $d$ has, by the described operation certainly been changed at the same time with the flint-glass lens, as will be seen, apparently and in fact being now of but little less aberration than the crown-glass lens $d$, Fig. 1; but the superfluous part of it has passed over to the other side of the flint-glass lens, forming there a new crown-glass lens $f$—viz., a negative meniscus of nearly the form as if it had been directly separated from $d$ by a cut. Thus these two new lenses $d$ and $f$ present combined an amount of spherical aberration but little greater than that of the crown-glass lens $d$, Fig. 3, and much smaller than that of $d$, Fig. 1. Hence its correction by the flint-glass lens will leave an accordingly small amount of aberration of second order. Furthermore, it is obvious that the focal power, and consequently the dispersive power, of the combined crown-glass lenses $d$ and $f$ are also accordingly diminished as against that of $d$, Fig. 1, being much lower than the latter, and therefore a correspondingly-small amount of chromatic aberration of second order will remain, as follows already from the simple fact that a high-dispersive flint glass is employed, as shown before. Thus the object of my invention has been fully accomplished by the described transformation illustrated in Fig. 6, as will be clearly understood, and said diagram may therefore be regarded as being a true representation of my improved aplanatic meniscus, which, as will be seen, forms a triplet of a novel type, consisting of one positive and two negative meniscuses of such forms as to permit their cementing together, and being combined in such order that the concave side of the positive meniscus forms one and the convex side of one of the negative meniscuses the other side of the combination, and the sides or surfaces of said meniscuses being of such proportional curvatures as to comply with the requirements of aplanatism, permitting neither over nor under correction of any of the optical aberrations to exist in the combination.

The following formula gives in millimeters the radii of the curvatures of the meniscus at a focal length of 25.3 inches:

| Refractive index. (line D) | Dispersion. (C to F.) | |
|---|---|---|
| Crown-Glass. 1.51828 | 0.00884 | $b = +90.50$ millimeters. $h = \mp 54.75$ millimeters. $e \mp 44.20$ millimeters. |
| Flint-Glass. 1.62023 | 0.01716 | $a - 132.50$ millimeters. |

The improvement of my triplet over the old doublet or over triplets of other forms or types consists in the reduction of the aberrations of second order, as shown. Thus a higher degree of correction is obtained, and consequently the light is collected much more accurately to a focal point than was heretofore possible in photographic lenses. The merits of my new objective are, therefore, a superior optical quality or higher degree of optical perfection, and consequently increased capacity and rapidity of photographic action and a superior definition of detail in the picture.

My new aplanatic meniscus may be used either singly or as a part of a compound whose other part or parts may be either one similar triplet, as represented in Fig. 7 of the accompanying drawings, or two or more such triplets or any other kind of aplanatic lens, or more lenses forming together an aplanatic combination for themselves independently from the triplet. In the case, however, that the compound objective consists of two triplets of my new form, as illustrated in Fig. 7, there may be a slight deviation in one direction from the rule given above in order to gain certain special advantages at the expense of optical perfection in another direction, provided the latter be of minor importance in the case. For instance, a slight over or under correction of one or the other aberration, or both, of either lens may remove or reduce the well-known defect termed "astigmatism" to a great advantage in the picture, while the slight injury thereby caused to the optical symmetry of the compound may not be of any perceptible consequence in the picture. The same is true in the case that the objective consists of a single aplanatic meniscus or triplet as described, which may, for instance, be for certain special purposes slightly under corrected in order to remove or reduce distortion at the sides of the picture.

In order to render my claims more distinct, I herewith remark expressly that I do not claim a combination of a triplet of apparently the new form described herein with a doublet described above, and illustrated in Fig. 3 of the accompanying drawings. The latter being spherically under corrected, as shown, a corresponding over correction of the triplet, and consequently a proportionally shorter meniscal curvature of the flint-glass lens $c$, Fig. 6, than that given in the above formula of this triplet, will be required in order to compensate the error of the doublet. Said over and under corrections disturb the optical symmetry required in a good photographic objective, thus causing distortion at the sides of the picture, and besides this the triplet is unfit to be used singly, not being aplanatic for itself. Such combination has been made by myself more than two years prior to this application, and I regard it as one of the experimental stages which finally resulted in the development of my invention described herein; but I do claim all such combinations or triplets of the described form which are on account of certain proper proportional curvatures, as described, aplanatic for themselves, or so nearly so as to secure the advantage or improvement over the old doublet of reduced aberrations of second order.

I do not limit my invention to the employment of crown-glass or one and the same kind of glass for the construction of the two lenses $a$ and $f$, Fig. 6; but different glasses of any kind suitable to accomplish the required result may be used for said lenses.

It is possible to construct or compose after the same new principle and with the same or a similar result a meniscus of more than three lenses by simply dividing any or all of the components of my triplet into two or more lenses and cementing them together. I regard such division of any of the components of my triplet to a system or systems of lenses, even if the new lenses of such system or systems thus produced are not made of precisely the same kinds of glass, as being merely designed to take the place of the corresponding single lens or lenses of my triplet and to produce the same or a similar optical effect, thus involving no improvement whatever.

Having thus fully described my improvement, what I claim as new, and desire to secure by Letters Patent, is—

1. A photographic objective composed of two positive and four negative meniscuses combined in two sets and arranged in the order as described, and shown in the accompanying drawings.

2. In a photographic objective, the combination of two achromatic or aplanatic or nearly achromatic or aplanatic meniscuses, each consisting of one positive and two negative meniscuses, the whole being so arranged that the concave sides of the two combinations face each other, substantially as described, and shown in the accompanying drawings.

3. In a photographic objective, the combination of two achromatic or aplanatic meniscuses, each consisting of one positive and two negative meniscuses, combined in such order that the concave side of the positive meniscus forms one and the convex side of one of the negative meniscuses the other external side in each combination, substantially as specified.

4. In a photographic objective, the combination of an aplanatic meniscus consisting of one single positive and two single negative meniscuses, as described, with an aplanatic meniscus of any description, substantially as specified.

5. In a photographic objective, the combination of an aplanatic meniscus consisting of one single positive and two single negative meniscuses, as described, with an aplanatic lens or an aplanatic combination of lenses of any description, substantially as shown.

6. A photographic objective or meniscus consisting of a single positive and two single negative meniscuses, combined in the order described, for the purpose specified.

ERNST GUNDLACH.

Witnesses:
CHARLES C. MILLER,
F. L. HEWITT.